United States Patent
Ali et al.

(10) Patent No.: US 10,947,468 B2
(45) Date of Patent: *Mar. 16, 2021

(54) FUEL COMPOSITIONS WITH ADDITIVES

(71) Applicant: BP OIL INTERNATIONAL LIMITED, Middlesex (GB)

(72) Inventors: Rana Ali, Reading (GB); Sorin Vasile Filip, Reading (GB)

(73) Assignee: BP OIL INTERNATIONAL LIMITED, Sunbury on Thames (GB)

( * ) Notice: Subject to any disclaimer, the term of this patent is extended or adjusted under 35 U.S.C. 154(b) by 0 days.

This patent is subject to a terminal disclaimer.

(21) Appl. No.: 16/077,457

(22) PCT Filed: Feb. 9, 2017

(86) PCT No.: PCT/EP2017/052931
§ 371 (c)(1),
(2) Date: Aug. 11, 2018

(87) PCT Pub. No.: WO2017/137519
PCT Pub. Date: Aug. 17, 2017

(65) Prior Publication Data
US 2019/0031971 A1    Jan. 31, 2019

(30) Foreign Application Priority Data

Feb. 11, 2016 (EP) .................................. 16155210

(51) Int. Cl.
*C10L 1/23* (2006.01)
*C10L 1/233* (2006.01)
(Continued)

(52) U.S. Cl.
CPC ............. *C10L 1/2335* (2013.01); *C10L 1/023* (2013.01); *C10L 1/233* (2013.01); *C10L 10/10* (2013.01);
(Continued)

(58) Field of Classification Search
CPC ........ C10L 1/2335; C10L 1/023; C10L 10/10; C10L 2290/24; C10L 2200/0423; C10L 2270/023

See application file for complete search history.

(56) References Cited

U.S. PATENT DOCUMENTS 1,833,429 A    11/1931    Lovell et al.
2,560,898 A    7/1951    Schulze et al.
(Continued)

FOREIGN PATENT DOCUMENTS

CN    101389738 A    3/2009
CN    101451080 A    6/2009
(Continued)

OTHER PUBLICATIONS

Han, Jeong Sik et al., "Liquid fuel composition with improved thermal stability", Dec. 2012, XP002759592, retrieved from STN, Database accession No. 2012:1371756.
(Continued)

*Primary Examiner* — Cephia D Toomer
(74) *Attorney, Agent, or Firm* — McDonnell Boehnen Hulbert & Berghoff LLP (57) ABSTRACT

A fuel composition for a spark-ignition internal combustion engine comprises a non-metallic octane-boosting additive. The non-metallic octane-boosting additive is an additive which, when used at a treat rate of 0.67 % by weight, increases the research octane number of a fuel by at least 1.8 whilst maintaining the $T_{90}$ and/or the vapour pressure.

22 Claims, 5 Drawing Sheets

(51) Int. Cl.
*C10L 1/02* (2006.01)
*C10L 10/10* (2006.01)

(52) U.S. Cl.
CPC . *C10L 2200/0423* (2013.01); *C10L 2270/023* (2013.01); *C10L 2290/24* (2013.01)

(56) References Cited

U.S. PATENT DOCUMENTS

| | | | |
|---|---|---|---|
| 2,881,061 | A | 4/1959 | Brennan et al. |
| 2,948,600 | A * | 8/1960 | Larson ............... C10L 1/14 44/376 |
| 4,304,712 | A | 12/1981 | Lai |
| 4,421,522 | A | 12/1983 | Seemuth |
| 4,552,672 | A | 11/1985 | Walker |
| 7,976,591 | B2 * | 7/2011 | Paggi ............... C10L 1/223 44/428 |
| 8,016,898 | B1 | 9/2011 | Lange et al. |
| 8,409,474 | B2 | 4/2013 | Lange et al. |
| 9,017,429 | B2 | 4/2015 | Griffiths et al. |
| 9,217,115 | B2 | 12/2015 | Lange et al. |
| 2004/0021637 | A1 | 2/2004 | Ahn |
| 2009/0019755 | A1 | 1/2009 | Moretti |

FOREIGN PATENT DOCUMENTS

| | | | |
|---|---|---|---|
| CN | 102234549 A | 11/2011 | |
| CN | 105085504 A | 11/2015 | |
| DE | 2926183 A1 | 1/1980 | |
| EP | 0234753 B1 | 11/1989 | |
| GB | 2308849 A | 7/1997 | |
| JP | 2003511491 A | 3/2003 | |
| JP | 2009502857 A | 1/2009 | |
| KR | 101297655 B1 * | 8/2013 | |
| WO | 2001053436 A1 | 7/2001 | |
| WO | 2005/087901 A2 | 9/2005 | |
| WO | WO-2010001341 A2 * | 1/2010 | ............ C01L 1/223 |
| WO | 2012/120147 A1 | 9/2012 | |
| WO | 2015/003961 A1 | 1/2015 | |

OTHER PUBLICATIONS

Mizar P et al., "Synthesis of substituted 4-(3-alkyl-1,2,4-oxadiazol-5-ylmethyl)-3,4-dihydro-2H-1,4-benzoxazines and 4-(1 H-benzimidazol-2-ylmethyl)-3,4-dihydro-2H-1,4-benzoxazines", Tetrahedron Letters, 47(44): 7823-7826, Oct. 30, 2006.

Goudert, "A new synthesis of 3,4-dihydro-2H-1,4-benzoxalines using solid-liquid phase transfer catalysis", Communications, pp. 541-543, Jul. 1, 1979.

Mizar P et al., "Synthesis of 2,3-dihydro-6H-1-oxa-3a-azaphenalene and its benzo/hetero-fused analog", Journal of Heterocyclic Chemistry, 48(5): 1187-1191, May 5, 2011.

Inoue, T et al., "Carboxylic acid compound having URAT1 activity-inhibitory effect, and use thereof", Dec. 2007, XP002759595, retrieved from STN, Database accession No. 2007:841279.

International Search Report and Written Opinion of the International Search Authority for International Application No. PCT/EP2017/052931, dated Apr. 4, 2017.

Search Report for EP 16155210.4, dated Jul. 22, 2016.

Park et al. "Mechanistic Insights into Thermal Stability Improvement of exo-Tetrahydrodicyclopentadiene by a New Hydrogen Donor" Energy Fuels 29: 16-20 (2015).

Park et al. "Thermal Stability Improvement of exo-Tetrahydrodicyclopentadiene by 1,2,3,4-Tetrahydroquinoxaline" J. Phys. Chem. C 17: 7399-7407 (2013).

Fu et al., "Simple and efficient synthesis of novel n-dichloroacetyl-3,4-dihydro-2H-1,4-benzoxazines", Dec. 2012, XP002759652, Database accession No. 2014:557179.

Perry B et al., "Achieving multi-isoform PI3K inhibition in a series of substituted 3,4-dihydro-2Hbenzo[1,4]oxazines", 7 Bioorganic & Medicinal Chemistry Letiers, 18(16):4700-4704, Aug. 15, 2008, XP002759654, Database accession No. 2008:96077 4.

Dominczak Net al., "A very short and efficient palladiumcatalyzed access to the 3,4-dihydro-2H-1,4-benzoxazine 8 structure", Letters in Organic Chemistry, 3(5), 371-373, 2006, XP002759655, retrieved from STN, Database Accession No. 2006:623620.

Liu Z et al., "Efficient synthesis of 2,3-dihydro-1,4-benzoxazines via intramolecular copper-catalyzed 0-arylation", Tetrahedron Letters, 50(27): 3790-3793, Jul. 8, 2009.

* cited by examiner

FUEL COMPOSITIONS WITH ADDITIVES

This application is a national stage application under 35 U.S.C. § 371 of International Application No. PCT/EP2017/052931, filed Feb. 9, 2017, which claims priority to European Patent Application No. EP 16155210.4, filed Feb. 11, 2016, the disclosures of which are explicitly incorporated by reference herein.

FIELD OF THE INVENTION

This invention relates to additives for use in a fuel for a spark-ignition internal combustion engine. In particular, the invention relates to non-metallic additives for use in increasing the octane number, whilst maintaining the $T_{90}$ and/or the vapour pressure, of a fuel for a spark-ignition internal combustion engine. The invention further relates to fuels for a spark-ignition internal combustion engine comprising the octane-boosting additives.

BACKGROUND OF THE INVENTION

Spark-ignition internal combustion engines are widely used for power, both domestically and in industry. For instance, spark-ignition internal combustion engines are commonly used to power vehicles, such as passenger cars, in the automotive industry.

Combustion in spark-ignition internal combustion engines is initiated by a spark which creates a flame front. The flame front progresses from the spark-plug and travels across the combustion chamber rapidly and smoothly until almost all of the fuel is consumed.

Spark-ignition internal combustion engines are widely thought to be more efficient when operating at higher compression ratios, i.e. when a higher degree of compression is placed upon the fuel/air mix in the engine prior to its ignition. Thus, modern, high performance spark-ignition internal combustion engines tend to operate at high compression ratios. Higher compression ratios are also desired when an engine has a high degree of supplemental pressure boosting to the intake charge.

However, increasing the compression ratio in an engine increases the possibility of abnormal combustion including that of auto-ignition, particularly when the engine is pressure boosted. A form of auto-ignition occurs when the end gas, typically understood to be the unburnt gas between the flame front and combustion chamber walls/piston, ignites spontaneously. On ignition, the end gas burns rapidly and prematurely ahead of the flame front in the combustion chamber, causing the pressure in the cylinder to rise sharply. This creates the characteristic knocking or pinking sound and is known as "knock", "detonation" or "pinking". In some cases, particularly with pressure-boosted engines, other forms of auto-ignition can even lead to destructive events known as "mega-knock" or "super-knock".

Knock occurs because the octane number (also known as the anti-knock rating or the octane rating) of the fuel is below the anti-knock requirement of the engine. Octane number is a standard measure used to assess the point at which knock will occur for a given fuel. A higher octane number means that a fuel-air mixture can withstand more compression before auto-ignition of the end gas occurs. In other words, the higher the octane number, the better the anti-knock properties of a fuel. Whilst the research octane number (RON) or the motor octane number (MON) may be used to assess the anti-knock performance of a fuel, in recent literature more weight is being given to the RON as an indicator of a fuel's anti-knock performance in modern automotive engines.

Accordingly, there is a need for fuels for spark-ignition internal combustion engines which have a high octane number, e.g. a high RON. There is a particular need for fuels for high compression ratio engines, including those utilising a high degree of supplemental pressure boosting to the intake charge, to have a high octane number so that higher engine efficiency may be enjoyed in the absence of knock.

In order to increase the octane number, octane improving additives are typically added to a fuel. Such additisation may be carried out by refineries or other suppliers, e.g. fuel terminals or bulk fuel blenders, so that the fuel meets applicable fuel specifications when the base fuel octane number is otherwise too low.

Organometallic compounds, comprising e.g. iron, lead or manganese, are well-known octane improvers, with tetraethyl lead (TEL) having been extensively used as a highly effective octane improver. However, TEL and other organometallic compounds are generally now only used in fuels in small amounts, if at all, as they can be toxic, damaging to the engine and damaging to the environment.

Octane improvers which are not based on metals include oxygenates (e.g. ethers and alcohols) and aromatic amines. However, these additives also suffer from various drawbacks. For instance, N-methyl aniline (NMA), an aromatic amine, must be used at a relatively high treat rate (1.5 to 2% weight additive/weight base fuel) to have a significant effect on the octane number of the fuel. NMA can also be toxic. Oxygenates give a reduction in energy density in the fuel and, as with NMA, have to be added at high treat rates, potentially causing compatibility problems with fuel storage, fuel lines, seals and other engine components.

Effort has been made to find alternative non-metallic octane improvers to NMA. GB 2 308 849 discloses dihydro benzoxazine derivatives for use as anti-knock agents. However, the derivatives provide a significantly smaller increase in the RON of a fuel than is provided by NMA at similar treat rates.

A further problem with octane improving additives is that they may have an effect on other properties of the fuel. For instance, on addition of the amounts of octane improving additive that are required to increase the octane number of a fuel, a significant alteration of the distillation profile, particularly an increase in the top end distillation temperatures, may be observed, such as the temperature at which 90% ($T_{90}$) or 95% ($T_{95}$) of the fuel blend is recovered from a typical fuel distillation test (e. g. according to ASTM D86). Such an increase is undesirable, since gasoline fuels with higher top end distillation temperatures tend to generate higher tailpipe hydrocarbon emissions, and have been implicated in the formation of engine oil sludge and in problems with low speed pre-ignition.

Alternatively, where lower mono-alcohols are used in a manner that results in an increase in octane number, a change to the vapour pressure of the final blend and to the distillation profile around the boiling point of the added alcohol is typically found. This can lead to drivability problems, particularly in regions with greater fluctuation in seasonal temperatures. Careful blending of the base fuel is therefore required to avoid drivability problems. Mono-ethers may also be used to help increase octane number. Whilst mono-ethers tend not to have the vapour pressure problems discussed above, a change to the distillation profile will typically be observed.

Accordingly, there remains a need for additives for a fuel for a spark-ignition internal combustion engine that are able to achieve anti-knock effects, e.g. at least comparable anti-knock effects to NMA, lower mono-alcohols and mono-ethers, without significantly changing the distillation profile and/or the vapour pressure of the fuel.

SUMMARY OF THE INVENTION

Surprisingly, it has now been found that a non-metallic octane-boosting additive may be used to increase the octane number, whilst maintaining the $T_{90}$ and/or the vapour pressure of a fuel for a spark-ignition internal combustion engine.

Accordingly, the present invention provides a fuel composition for a spark-ignition internal combustion engine, the fuel composition comprising a non-metallic octane-boosting additive and a base fuel, wherein the non-metallic octane-boosting additive, when used at a treat rate of 0.67% weight additive/weight base fuel, increases the research octane number of a fuel by at least 1.8 without:
increasing the $T_{90}$ by more than 2.0%; or
increasing the vapour pressure by more than 2.0%.

Also provided is the use of a non-metallic octane-boosting additive for increasing the octane number, whilst maintaining the $T_{90}$ or the vapour pressure, of a fuel for a spark-ignition internal combustion engine, as well as a method for increasing the octane number, whilst maintaining the $T_{90}$ or the vapour pressure, of a fuel for a spark-ignition internal combustion engine, wherein the method comprises blending a non-metallic octane-boosting additive with the fuel.

BRIEF DESCRIPTION OF THE FIGURES

FIGS. 1a-c are graphs of the change in octane number (both RON and MON) of fuels when treated with varying amounts of a non-metallic octane-boosting additive. Specifically.

FIGS. 2a-c show graphs comparing the change in octane number (both RON and MON) of fuels when treated with a non-metallic octane-boosting additive and N-methyl aniline. Specifically.

DETAILED DESCRIPTION OF THE INVENTION

Octane-Boosting Additive

The non-metallic octane-boosting additive that is used in the present invention, when used at a treat rate of 0.67% weight additive/weight base fuel, increases the research octane number of a fuel by at least 1.8 (preferably by at least 2.5, and more preferably by at least 3.0) without increasing: the $T_{90}$ by more than 2.5% (preferably 2.0%, and more preferably 1.5%); or the vapour pressure by more than 2.0% (preferably 1.0%, and more preferably 0.5%) (referred to in short as an octane-boosting additive described herein).

In preferred embodiments, the non-metallic octane-boosting additive, when used at a treat rate of 0.67% w/w, increases the research octane number of a fuel by at least 1.8 (preferably by at least 2.5, and more preferably by at least 3.0) without increasing: the $T_{90}$ by more than 2.5% (preferably 2.0%, and more preferably 1.5%); and the vapour pressure by more than 2.0% (preferably 1.0%, and more preferably 0.5%).

The non-metallic octane-boosting additive may have a blending research octane number of greater than 290, preferably greater than 300, and more preferably greater than 310. The blending RON may be calculated from the RON of a base fuel and a base fuel that has been treated with the non-metallic octane-boosting additive at a treat rate of 1.0% weight additive/weight base fuel. Thus, the blending RON may be calculated according to the following formula:

$$\text{Blending RON} = (\text{RON}_{blend} - 0.99 \times \text{RON}_{base\ fuel}))/0.01$$

where: $\text{RON}_{blend}$ is the RON of the base fuel that has been treated with the non-metallic octane boosting additive at a treat rate of 1.0% w/w, and
$\text{RON}_{base\ fuel}$ is the RON of the base fuel.

The non-metallic octane-boosting additive that is used in the present invention preferably consists solely of C, H, N and O atoms, with the number of N atoms limited to two, and preferably one per molecule of octane-boosting additive.

The non-metallic octane-boosting additive may have a molecular weight of less than 300, preferably less than 250, and more preferably less than 200 g/mole.

The octane-boosting additive may have a chemical structure comprising a 6-membered aromatic ring sharing two adjacent aromatic carbon atoms with a 6- or 7-membered saturated heterocyclic ring, the 6- or 7-membered saturated heterocyclic ring comprising a nitrogen atom directly bonded to one of the shared carbon atoms to faun a secondary amine and an atom selected from oxygen or nitrogen directly bonded to the other shared carbon atom, the remaining atoms in the 6- or 7-membered heterocyclic ring being carbon. As will be appreciated, the 6- or 7-membered heterocyclic ring sharing two adjacent aromatic carbon atoms with the 6-membered aromatic ring may be considered saturated but for those two shared carbon atoms, and may thus be termed "otherwise saturated."

Alternatively stated, the octane-boosting additive used in the present invention may be a substituted or unsubstituted 3,4-dihydro-2H-benzo[b][1,4]oxazine (also known as benzomorpholine), or a substituted or unsubstituted 2,3,4,5-tetrahydro-1,5-benzoxazepine. In other words, the additive may be 3,4-dihydro-2H-benzo[b][1,4]oxazine or a derivative thereof, or 2,3,4,5-tetrahydro-1,5-benzoxazepine or a derivative thereof. Accordingly, the additive may comprise one or more substituents and is not particularly limited in relation to the number or identity of such substituents.

Highly preferred additives have the following formula:

where: $R_1$ is hydrogen;

$R_2$, $R_3$, $R_4$, $R_5$, $R_{11}$ and $R_{12}$ are each independently selected from hydrogen, alkyl, alkoxy, alkoxy-alkyl, secondary amine and tertiary amine groups;

$R_6$, $R_7$, $R_8$ and $R_9$ are each independently selected from hydrogen, alkyl, alkoxy, alkoxy-alkyl, secondary amine and tertiary amine groups;

X is selected from —O— or —$NR_{10}$—, where $R_{10}$ is selected from hydrogen and alkyl groups; and n is 0 or 1.

In some embodiments, $R_2$, $R_3$, $R_4$, $R_5$, $R_{11}$ and $R_{12}$ are each independently selected from hydrogen and alkyl groups, and preferably from hydrogen, methyl, ethyl, propyl and butyl groups. More preferably, $R_2$, $R_3$, $R_4$, $R_5$, $R_{11}$ and $R_{12}$ are each independently selected from hydrogen, methyl and ethyl, and even more preferably from hydrogen and methyl.

In some embodiments, $R_6$, $R_7$, $R_8$ and $R_9$ are each independently selected from hydrogen, alkyl and alkoxy groups, and preferably from hydrogen, methyl, ethyl, propyl, butyl, methoxy, ethoxy and propoxy groups. More preferably, $R_6$, $R_7$, $R_8$ and $R_9$ are each independently selected from hydrogen, methyl, ethyl and methoxy, and even more preferably from hydrogen, methyl and methoxy.

Advantageously, at least one of $R_2$, $R_3$, $R_4$, $R_5$, $R_6$, $R_7$, $R_8$, $R_9$, $R_{11}$ and $R_{12}$, and preferably at least one of $R_6$, $R_7$, $R_8$ and $R_9$, is selected from a group other than hydrogen. More preferably, at least one of $R_7$ and $R_8$ is selected from a group other than hydrogen. Alternatively stated, the octane-boosting additive may be substituted in at least one of the positions represented by $R_2$, $R_3$, $R_4$, $R_5$, $R_6$, $R_7$, $R_8$, $R_9$, $R_{11}$ and $R_{12}$, preferably in at least one of the positions represented by $R_6$, $R_7$, $R_8$ and $R_9$, and more preferably in at least one of the positions represented by $R_7$ and $R_8$. It is believed that the presence of at least one group other than hydrogen may improve the solubility of the octane-boosting additives in a fuel.

Also advantageously, no more than five, preferably no more than three, and more preferably no more than two, of $R_2$, $R_3$, $R_4$, $R_5$, $R_6$, $R_7$, $R_8$, $R_9$, $R_{11}$ and $R_{12}$ are selected from a group other than hydrogen. Preferably, one or two of $R_2$, $R_3$, $R_4$, $R_5$, $R_6$, $R_7$, $R_8$, $R_9$, $R_{11}$ and $R_{12}$ are selected from a group other than hydrogen. In some embodiments, only one of $R_2$, $R_3$, $R_4$, $R_5$, $R_6$, $R_7$, $R_8$, $R_9$, $R_{11}$ and $R_{12}$ is selected from a group other than hydrogen.

It is also preferred that at least one of $R_2$ and $R_3$ is hydrogen, and more preferred that both of $R_2$ and $R_3$ are hydrogen.

In preferred embodiments, at least one of $R_4$, $R_5$, $R_7$ and $R_8$ is selected from methyl, ethyl, propyl and butyl groups and the remainder of $R_2$, $R_3$, $R_4$, $R_5$, $R_6$, $R_7$, $R_8$, $R_9$, $R_{11}$ and $R_{12}$ are hydrogen. More preferably, at least one of $R_7$ and $R_8$ are selected from methyl, ethyl, propyl and butyl groups and the remainder of $R_2$, $R_3$, $R_4$, $R_5$, $R_6$, $R_7$, $R_8$, $R_9$, $R_{11}$ and $R_{12}$ are hydrogen.

In further preferred embodiments, at least one of $R_4$, $R_5$, $R_7$ and $R_8$ is a methyl group and the remainder of $R_2$, $R_3$, $R_4$, $R_5$, $R_6$, $R_7$, $R_8$, $R_9$, $R_{11}$ and $R_{12}$ are hydrogen. More preferably, at least one of $R_7$ and $R_8$ is a methyl group and the remainder of $R_2$, $R_3$, $R_4$, $R_5$, $R_6$, $R_7$, $R_8$, $R_9$, $R_{11}$ and $R_{12}$ are hydrogen.

Preferably, X is —O— or —$NR_{10}$—, where $R_{10}$ is selected from hydrogen, methyl, ethyl, propyl and butyl groups, and preferably from hydrogen, methyl and ethyl groups. More preferably, $R_{10}$ is hydrogen. In preferred embodiments, X is —O—.

n may be 0 or 1, though it is preferred that n is 0.

Octane-boosting additives that may be used in the present invention include:

Preferred octane-boosting additives include:

A mixture of additives may be used in the fuel composition. For instance, the fuel composition may comprise a mixture of:

It will be appreciated that references to alkyl groups include different isomers of the alkyl group. For instance, references to propyl groups embrace n-propyl and i-propyl groups, and references to butyl embrace n-butyl, isobutyl, sec-butyl and tert-butyl groups.

Fuel Composition

The octane-boosting additives described herein are used in a fuel composition for a spark-ignition internal combustion engine. It will be appreciated that the octane-boosting additives may be used in engines other than spark-ignition internal combustion engines, provided that the fuel in which the additive is used is suitable for use in a spark-ignition internal combustion engine. Gasoline fuels (including those containing oxygenates) are typically used in spark-ignition internal combustion engines. Commensurately, the fuel composition according to the present invention may be a gasoline fuel composition.

The fuel composition may comprise a major amount (i.e. greater than 50% by weight) of liquid fuel ("base fuel") and a minor amount (i.e. less than 50% by weight) of octane-boosting additive described herein, i.e. an additive which, when used at a treat rate of 0.67% w/w, increases the research octane number of a fuel by at least 1.8 without increasing the $T_{90}$ by more than 2.0%, or the vapour pressure by more than 2.0%.

Examples of suitable liquid fuels include hydrocarbon fuels, oxygenate fuels and combinations thereof.

Hydrocarbon fuels that may be used in a spark-ignition internal combustion engine may be derived from mineral sources and/or from renewable sources such as biomass (e.g. biomass-to-liquid sources) and/or from gas-to-liquid sources and/or from coal-to-liquid sources.

Oxygenate fuels that may be used in a spark-ignition internal combustion engine contain oxygenate fuel components, such as alcohols and ethers. Suitable alcohols include straight and/or branched chain alkyl alcohols having from 1 to 6 carbon atoms, e.g. methanol, ethanol, n-propanol, n-butanol, isobutanol, tert-butanol. Preferred alcohols include methanol and ethanol. Suitable ethers include ethers having 5 or more carbon atoms, e.g. methyl tert-butyl ether and ethyl tert-butyl ether.

In some preferred embodiments, the fuel composition comprises ethanol, e.g. ethanol complying with EN 15376: 2014. The fuel composition may comprise ethanol in an amount of up to 85%, preferably from 1% to 30%, more preferably from 3% to 20%, and even more preferably from 5% to 15%, by volume. For instance, the fuel may contain ethanol in an amount of about 5% by volume (i.e. an E5 fuel), about 10% by volume (i.e. an E10 fuel) or about 15% by volume (i.e. an E15 fuel). A fuel which is free from ethanol is referred to as an E0 fuel.

Ethanol is believed to improve the solubility of the octane-boosting additives described herein in the fuel. Thus, in some embodiments, for instance where the octane-boosting additive is unsubstituted (e.g. an additive in which $R_1$, $R_2$, $R_3$, $R_4$, $R_5$, $R_6$, $R_7$, $R_8$ and $R_9$ are hydrogen; X is —O—; and n is 0) it may be preferable to use the additive with a fuel which comprises ethanol.

In preferred embodiments, the octane-boosting additives described herein may be used in an E0 to E15, preferably an E0 to E10, base fuel having a research octane number of at least 80, preferably from 85 to 100. For instance, the octane-boosting additives described herein may be used in an E0, E5 or E10 base fuel having a research octane number of at least 85, or at least 90, but no more than 98.

The fuel composition may meet particular automotive industry standards. For instance, the fuel composition may have a maximum oxygen content of 2.7% by mass. The fuel composition may have maximum amounts of oxygenates as specified in EN 228, e.g. methanol: 3.0% by volume, ethanol: 5.0% by volume, iso-propanol: 10.0% by volume, iso-butyl alcohol: 10.0% by volume, tert-butanol: 7.0% by volume, ethers (e.g. having 5 or more carbon atoms): 10% by volume and other oxygenates (subject to suitable final boiling point): 10.0% by volume.

The fuel composition may have a sulfur content of up to 50.0 ppm by weight, e.g. up to 10.0 ppm by weight.

Examples of suitable fuel compositions include leaded and unleaded fuel compositions. Preferred fuel compositions are unleaded fuel compositions.

In preferred embodiments, the fuel composition meets the requirements of EN 228, e.g. as set out in BS EN 228:2012. In other preferred embodiments, the fuel composition meets the requirements of ASTM D 4814, e.g. as set out in ASTM D 4814-15a. It will be appreciated that the fuel compositions may meet both requirements, and/or other fuel standards.

The fuel composition for a spark-ignition internal combustion engine may exhibit one or more (such as all) of the following, e.g., as defined according to BS EN 228:2012: a minimum research octane number of 95.0, a minimum motor octane number of 85.0 a maximum lead content of 5.0 mg/l, a density of 720.0 to 775.0 kg/m³, an oxidation stability of at least 360 minutes, a maximum existent gum content (solvent washed) of 5 mg/100 ml, a class 1 copper strip corrosion (3 h at 50° C.), clear and bright appearance, a maximum olefin content of 18.0% by weight, a maximum aromatics content of 35.0% by weight, and a maximum benzene content of 1.00% by volume.

The fuel composition may contain the octane-boosting additive described herein in an amount of up to 20%, preferably from 0.1% to 10%, and more preferably from 0.2% to 5% weight additive/weight base fuel. Even more preferably, the fuel composition contains the octane-boosting additive in an amount of from 0.25% to 2%, and even more preferably still from 0.3% to 1% weight additive/weight base fuel. It will be appreciated that, when more than one octane-boosting additive described herein is used, these values refer to the total amount of octane-boosting additive described herein in the fuel.

The fuel compositions may comprise at least one other further fuel additive.

Examples of such other additives that may be present in the fuel compositions include detergents, friction modifiers/anti-wear additives, corrosion inhibitors, combustion modifiers, anti-oxidants, valve seat recession additives, dehazers/ demulsifiers, dyes, markers, odorants, anti-static agents, anti-microbial agents, and lubricity improvers.

Further octane improvers may also be used in the fuel composition, i.e. octane improvers which are not octane-boosting additives described herein, i.e. they do not, when used at a treat rate of 0.67% weight additive/weight base fuel, increase the research octane number of a fuel by at least 1.8 without increasing the $T_{90}$ by more than 2.0% or without increasing the vapour pressure by more than 2.0%.

Examples of suitable detergents include polyisobutylene amines (PIB amines) and polyether amines.

Examples of suitable friction modifiers and anti-wear additives include those that are ash-producing additives or ashless additives. Examples of friction modifiers and anti-wear additives include esters (e.g. glycerol mono-oleate) and fatty acids (e.g. oleic acid and stearic acid).

Examples of suitable corrosion inhibitors include ammonium salts of organic carboxylic acids, amines and heterocyclic aromatics, e.g. alkylamines, imidazolines and tolyl-triazoles.

Examples of suitable anti-oxidants include phenolic anti-oxidants (e.g. 2,4-di-tert-butylphenol and 3,5-di-tert-butyl-4-hydroxyphenylpropionic acid) and aminic anti-oxidants (e.g. para-phenylenediamine, dicyclohexylamine and derivatives thereof).

Examples of suitable valve seat recession additives include inorganic salts of potassium or phosphorus.

Examples of suitable further octane improvers include non-metallic octane improvers include N-methyl aniline and nitrogen-based ashless octane improvers. Metal-containing octane improvers, including methylcyclopentadienyl manganese tricarbonyl, ferrocene and tetra-ethyl lead, may also be used. However, in preferred embodiments, the fuel composition is free of all added metallic octane improvers including methyl cyclopentadienyl manganese tricarbonyl and other metallic octane improvers including e.g. ferrocene and tetraethyl lead.

Examples of suitable dehazers/demulsifiers include phenolic resins, esters, polyamines, sulfonates or alcohols which are grafted onto polyethylene or polypropylene glycols.

Examples of suitable markers and dyes include azo or anthraquinone derivatives.

Examples of suitable anti-static agents include fuel soluble chromium metals, polymeric sulfur and nitrogen compounds, quaternary ammonium salts or complex organic alcohols. However, the fuel composition is preferably substantially free from all polymeric sulfur and all metallic additives, including chromium based compounds.

In some embodiments, the fuel composition comprises solvent, e.g. which has been used to ensure that the additives are in a form in which they can be stored or combined with the liquid fuel. Examples of suitable solvents include polyethers and aromatic and/or aliphatic hydrocarbons, e.g. heavy naphtha e.g. Solvesso (Trade mark), xylenes and kerosene.

Representative typical and more typical independent amounts of additives (if present) and solvent in the fuel composition are given in the table below. For the additives, the concentrations are expressed by weight (of the base fuel) of active additive compounds, i.e. independent of any solvent or diluent. Where more than one additive of each type is present in the fuel composition, the total amount of each type of additive is expressed in the table below.

| | Fuel Composition | |
|---|---|---|
| | Typical amount (ppm, by weight) | More typical amount (ppm, by weight) |
| Octane-boosting additives | 1000 to 100000 | 2000 to 50000 |
| Detergents | 10 to 2000 | 50 to 300 |
| Friction modifiers and anti-wear additives | 10 to 500 | 25 to 150 |
| Corrosion inhibitors | 0.1 to 100 | 0.5 to 40 |
| Anti-oxidants | 1 to 100 | 10 to 50 |
| Further octane improvers | 0 to 20000 | 50 to 10000 |
| Dehazers and demulsifiers | 0.05 to 30 | 0.1 to 10 |
| Anti-static agents | 0.1 to 5 | 0.5 to 2 |
| Other additive components | 0 to 500 | 0 to 200 |
| Solvent | 10 to 3000 | 50 to 1000 |

In some embodiments, the fuel composition comprises or consists of additives and solvents in the typical or more typical amounts recited in the table above.

Fuel compositions of the present invention may be produced by a process which comprises combining, in one or more steps, a fuel for a spark-ignition internal combustion engine with an octane-boosting additive described herein. In embodiments in which the fuel composition comprises one or more further fuel additives, the further fuel additives may also be combined, in one or more steps, with the fuel.

In some embodiments, the octane-boosting additive may be combined with the fuel in the form of a refinery additive composition or as a marketing additive composition. Thus, the octane-boosting additive may be combined with one or more other components (e.g. additives and/or solvents) of the fuel composition as a marketing additive, e.g. at a terminal or distribution point. The octane-boosting additive may also be added on its own at a terminal or distribution point. The octane-boosting additive may also be combined with one or more other components (e.g. additives and/or solvents) of the fuel composition for sale in a bottle, e.g. for addition to fuel at a later time.

The octane-boosting additive and any other additives of the fuel composition may be incorporated into the fuel composition as one or more additive concentrates and/or additive part packs, optionally comprising solvent or diluent.

The octane-boosting additive may also be added to the fuel within a vehicle in which the fuel is used, either by addition of the additive to the fuel stream or by addition of the additive directly into the combustion chamber.

It will also be appreciated that the octane-boosting additive may be added to the fuel in the form of a precursor compound which, under the combustion conditions encountered in an engine, breaks down to form an octane-boosting additive as defined herein.

Uses and Methods

The octane-boosting additives disclosed herein are used in a fuel for a spark-ignition internal combustion engine. Examples of spark-ignition internal combustion engines include direct injection spark-ignition engines and port fuel injection spark-ignition engines. The spark-ignition internal combustion engine may be used in automotive applications, e.g. in a vehicle such as a passenger car.

Examples of suitable direct injection spark-ignition internal combustion engines include boosted direct injection spark-ignition internal combustion engines, e.g. turbocharged boosted direct injection engines and supercharged boosted direct injection engines. Suitable engines include 2.0 L boosted direct injection spark-ignition internal combustion engines. Suitable direct injection engines include those that have side mounted direct injectors and/or centrally mounted direct injectors.

Examples of suitable port fuel injection spark-ignition internal combustion engines include any suitable port fuel injection spark-ignition internal combustion engine including e.g. a BMW 318i engine, a Ford 2.3L Ranger engine and an MB M111 engine.

The octane-boosting additives disclosed herein may be used to increase the research octane number (RON) of the fuel. When used at a treat rate of 0.67% w/w, the octane-boosting additives disclosed herein may increase the research octane number of the fuel by at least 1.8, preferably by at least 2.5 and more preferably by at least 3.0. In preferred embodiments, the octane-boosting additives also increase the MON of the fuel. The RON and MON of the fuel may be tested according to ASTM D2699-15a and ASTM D2700-13, respectively.

When used at a treat rate of 0.67% w/w, the octane-boosting additives disclosed herein may be used to increase the octane number of the fuel whilst maintaining the $T_{90}$. The $T_{90}$ may be maintained by not increasing by more than 2.5%, preferably by more than 2.0%, and more preferably by more than 1.5%. $T_{90}$ may be tested according to ASTM D86-15.

When used at a treat rate of 0.67% w/w, the octane-boosting additives disclosed herein may increase the octane number of the fuel whilst maintaining the vapour pressure. The vapour pressure may be maintained by not increasing by more than 2.0%, preferably by more than 1.0%, and more preferably by more than 0.5%. Preferably, the octane-boosting additives disclosed herein may be used whilst maintaining the air saturated vapour pressure (ASVP) or whilst maintaining the dry vapour pressure equivalent (DVPE). Preferably, the octane-boosting additives disclosed herein may be used whilst maintaining the ASVP and whilst maintaining the DVPE. The vapour pressure of the fuel may be tested according to BS EN 13016-1:2007.

Preferably, the octane-boosting additives disclosed herein are additives which, when used at a treat rate of 0.67% w/w, increase the research octane number of an E0 base having a RON of 90 by at least 1.8, without increasing: the T90 by more than 2.5%; or the vapour pressure by more than 2.0%.

In preferred embodiments, the octane-boosting additives disclosed herein are used to increase the octane number of the fuel whilst maintaining both the $T_{90}$ and the vapour pressure.

Since the octane-boosting additives described herein increase the octane number of a fuel for a spark-ignition internal combustion engine, they may also be used to address abnormal combustion that may arise as a result of a lower than desirable octane number. Thus, the octane-boosting additives may be used for improving the auto-ignition characteristics of a fuel, e.g. by reducing the propensity of a fuel for at least one of auto-ignition, pre-ignition, knock, mega-knock and super-knock, when used in a spark-ignition internal combustion engine.

Also contemplated is a method for increasing the octane number of a fuel for a spark-ignition internal combustion engine, as well as a method for improving the auto-ignition characteristics of a fuel, e.g. by reducing the propensity of a fuel for at least one of auto-ignition, pre-ignition, knock, mega-knock and super-knock, when used in a spark-ignition internal combustion engine. These methods comprise the step of blending an octane-boosting additive described herein with the fuel.

The methods described herein may further comprise delivering the blended fuel to a spark-ignition internal combustion engine and/or operating the spark-ignition internal combustion engine.

The invention will now be described with reference to the following non-limiting examples.

EXAMPLES

Example 1

Preparation of Non-Metallic Octane-Boosting Additives

The following non-metallic octane-boosting additives were prepared using standard methods:

OX1

OX2

OX3

OX4

OX5

OX6

OX7

OX8

Example 2

Octane Number of Fuels Containing Non-Metallic Octane-Boosting Additives

The effect of non-metallic octane-boosting additives from Example 1 ((OX1, OX2, OX3, OX5, OX6, OX8, OX9, OX12, OX13, OX17 and OX19) on the octane number of two different base fuels for a spark-ignition internal combustion engine was measured.

The additives were added to the fuels at a relatively low treat rate of 0.67% weight additive/weight base fuel, equivalent to a treat rate of 5 g additive/litre of fuel. The first fuel was an E0 gasoline base fuel. The second fuel was an E10 gasoline base fuel. The RON and MON of the base fuels, as well as the blends of base fuel and non-metallic octane-boosting additive, were determined according to ASTM D2699 and ASTM D2700, respectively.

The following table shows the RON and MON of the fuel and the blends of fuel and non-metallic octane-boosting additive, as well as the change in the RON and MON that was brought about by using the non-metallic octane-boosting additives:

|  | E0 base fuel | | | | E10 base fuel | | | |
| --- | --- | --- | --- | --- | --- | --- | --- | --- |
| Additive | RON | MON | ΔRON | ΔMON | RON | MON | ΔRON | ΔMON |
| — | 95.4 | 86.0 | n/a | n/a | 95.4 | 85.2 | n/a | n/a |
| OX1 | — | — | — | — | 97.3 | 86.3 | 1.9 | 1.1 |
| OX2 | 97.7 | 87.7 | 2.3 | 1.7 | 97.8 | 86.5 | 2.4 | 1.3 |
| OX3 | 97.0 | 86.7 | 1.6 | 0.7 | 97.1 | 85.5 | 1.7 | 0.3 |
| OX5 | 97.0 | 86.5 | 1.6 | 0.5 | 97.1 | 85.5 | 1.7 | 0.3 |
| OX6 | 98.0 | 87.7 | 2.6 | 1.7 | 98.0 | 86.8 | 2.6 | 1.6 |
| OX8 | 96.9 | 86.1 | 1.5 | 0.1 | 96.9 | 85.7 | 1.5 | 0.5 |
| OX9 | 97.6 | 86.9 | 2.2 | 0.9 | 97.6 | 86.5 | 2.2 | 1.3 |
| OX12 | 97.4 | 86.3 | 2.0 | 0.3 | 97.3 | 86.1 | 1.9 | 0.9 |
| OX13 | 97.9 | 86.5 | 2.5 | 0.5 | 97.7 | 86.1 | 2.3 | 0.9 |
| OX17 | 97.5 | 86.4 | 2.1 | 0.4 | 97.4 | 86.4 | 2.0 | 1.2 |
| OX19 | 97.4 | 86.1 | 2.0 | 0.1 | 97.6 | 85.9 | 2.2 | 0.7 |

It can be seen that the non-metallic octane-boosting additives may be used to increase the RON of an ethanol-free and an ethanol-containing fuel for a spark-ignition internal combustion engine.

Further additives from Example 1 (OX4, OX7, OX10, OX11, OX14, OX15, OX16 and OX18) were tested in the E0 gasoline base fuel and the E10 gasoline base fuel. Each of the additives increased the RON of both fuels, aside from OX7 where there was insufficient additive to carry out analysis with the ethanol-containing fuel.

Example 3

Variation of Octane Number with Non-Metallic Octane-Boosting Additive Treat Rate The effect of a non-metallic octane-boosting additive from Example 1 (OX6) on the octane number of three different base fuels for a spark-ignition internal combustion engine was measured over a range of treat rates (% weight additive/weight base fuel).

The first and second fuels were E0 gasoline base fuels. The third fuel was an E10 gasoline base fuel. As before, the RON and MON of the base fuels, as well as the blends of base fuel and non-metallic octane-boosting additive, were determined according to ASTM D2699 and ASTM D2700, respectively.

The following table shows the RON and MON of the fuels and the blends of fuel and non-metallic octane-boosting additive, as well as the change in the RON and MON that was brought about by using the non-metallic octane-boosting additives:

|  | Additive treat rate | Octane number | | | |
|---|---|---|---|---|---|
|  | (% w/w) | RON | MON | ΔRON | ΔMON |
| E0 90 RON | 0.00 | 89.9 | 82.8 | 0.0 | 0.0 |
|  | 0.20 | 91.5 | 83.5 | 1.6 | 0.7 |
|  | 0.30 | 92.0 | 83.6 | 2.1 | 0.8 |
|  | 0.40 | 92.5 | 83.8 | 2.6 | 1.0 |
|  | 0.50 | 92.9 | 83.8 | 3.0 | 1.0 |
|  | 0.67 | 93.6 | 84.2 | 3.7 | 1.4 |
|  | 1.01 | 94.7 | 85.0 | 4.8 | 2.2 |
|  | 1.34 | 95.9 | 85.4 | 6.0 | 2.6 |
|  | 10.00 | 104.5 | 87.9 | 14.6 | 5.1 |
| E0 95 RON | 0.00 | 95.2 | 85.6 | 0.0 | 0.0 |
|  | 0.10 | 95.9 | 85.8 | 0.7 | 0.2 |
|  | 0.20 | 96.4 | 86.3 | 1.2 | 0.7 |
|  | 0.30 | 96.6 | 86.8 | 1.4 | 1.2 |
|  | 0.40 | 97.1 | 86.6 | 1.9 | 1.0 |
|  | 0.50 | 97.3 | 87.0 | 2.1 | 1.4 |
|  | 0.60 | 97.5 | 86.8 | 2.3 | 1.2 |
|  | 0.70 | 97.8 | 86.8 | 2.6 | 1.2 |
|  | 0.80 | 98.0 | 87.3 | 2.8 | 1.7 |
|  | 0.90 | 98.5 | 86.8 | 3.3 | 1.2 |
|  | 1.00 | 98.7 | 86.9 | 3.5 | 1.3 |
|  | 10.00 | 105.7 | 88.7 | 10.5 | 3.1 |
| E10 95 RON | 0.00 | 95.4 | 85.1 | 0.0 | 0.0 |
|  | 0.10 | 95.9 | 85.2 | 0.5 | 0.1 |
|  | 0.20 | 96.3 | 86.3 | 0.9 | 1.2 |
|  | 0.30 | 96.8 | 86.3 | 1.4 | 1.2 |
|  | 0.40 | 96.9 | 85.8 | 1.5 | 0.7 |
|  | 0.50 | 97.3 | 85.9 | 1.9 | 0.8 |
|  | 0.60 | 97.4 | 85.9 | 2.0 | 0.8 |
|  | 0.70 | 97.9 | 86.0 | 2.5 | 0.9 |
|  | 0.80 | 98.2 | 86.8 | 2.8 | 1.7 |
|  | 0.90 | 98.7 | 86.3 | 3.3 | 1.2 |
|  | 1.00 | 98.8 | 86.5 | 3.4 | 1.4 |
|  | 10.00 | 105.1 | 87.8 | 9.7 | 2.7 |

Figure 1A:
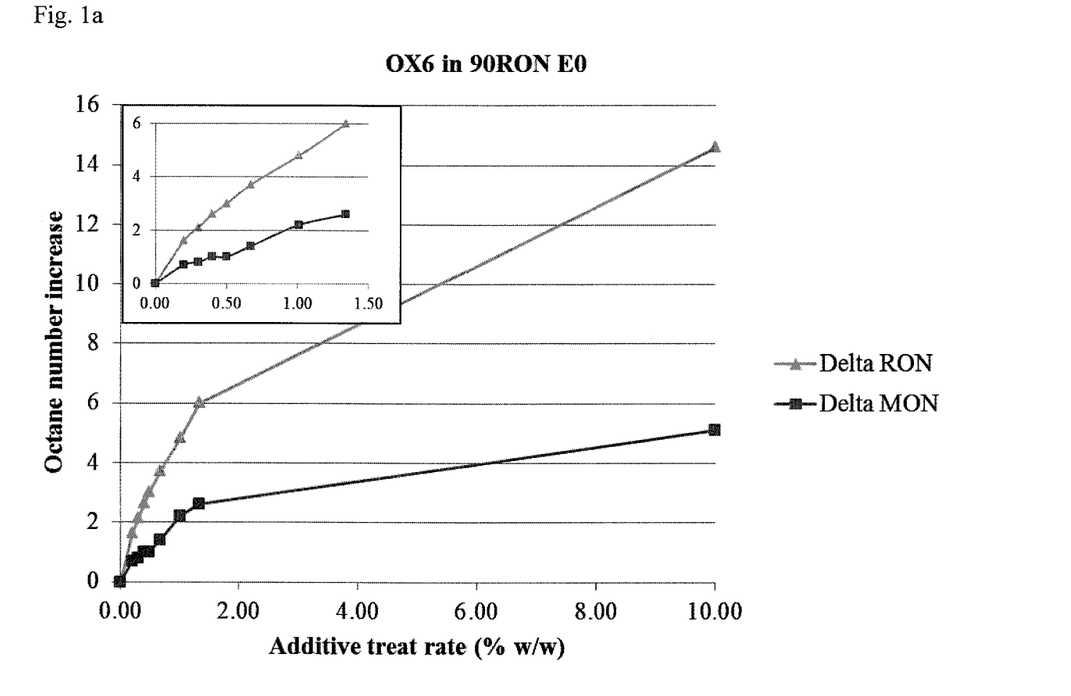
FIG. 1a shows a graph of the change in octane number of an E0 fuel having a RON of 90.
Figure 1B:
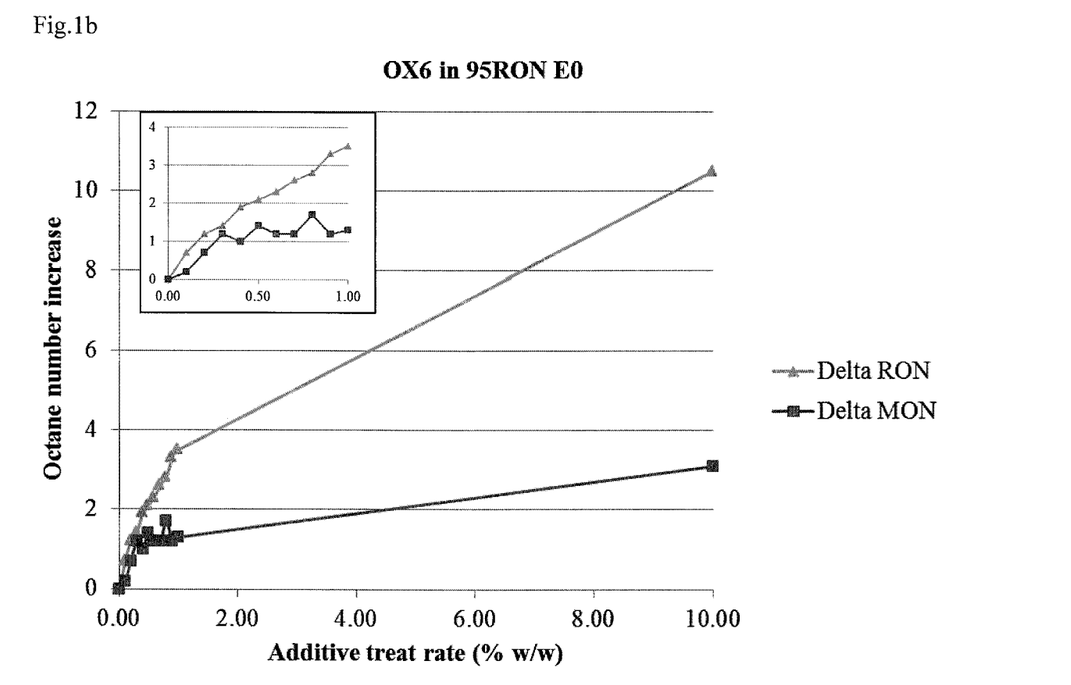
FIG. 1b shows a graph of the change in octane number of an E0 fuel having a RON of 95.
Figure 1C:
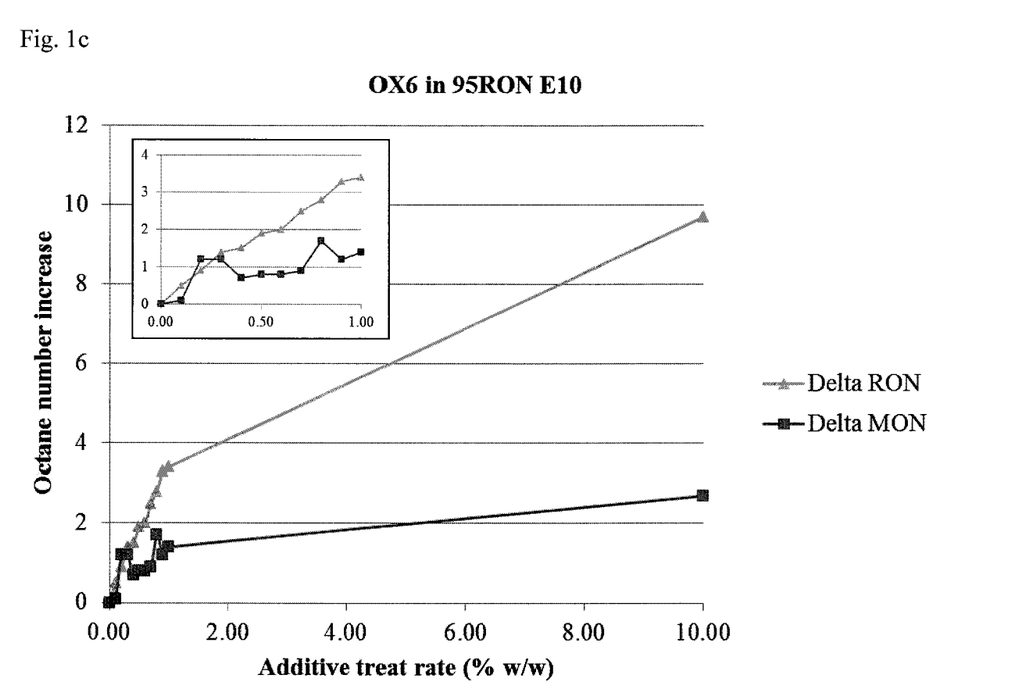
FIG. 1c shows a graph of the change in octane number of an E10 fuel having a RON of 95.

Graphs of the effect of the non-metallic octane-boosting additive on the RON and MON of the three fuels are shown in FIGS. 1a-c. It can be seen that the non-metallic octane-boosting additive had a significant effect on the octane numbers of each of the fuels, even at very low treat rates.

Example 4

Comparison of Non-Metallic Octane-Boosting Additive with N-Methyl Aniline

The effect of non-metallic octane-boosting additives from Example 1 (OX2 and OX6) was compared with the effect of N-methyl aniline on the octane number of two different base fuels for a spark-ignition internal combustion engine over a range of treat rates (% weight additive/weight base fuel).

The first fuel was an E0 gasoline base fuel. The second fuel was an E10 gasoline base fuel. As before, the RON and MON of the base fuels, as well as the blends of base fuel and non-metallic octane-boosting additive, were determined according to ASTM D2699 and ASTM D2700, respectively.

Figure 2A:
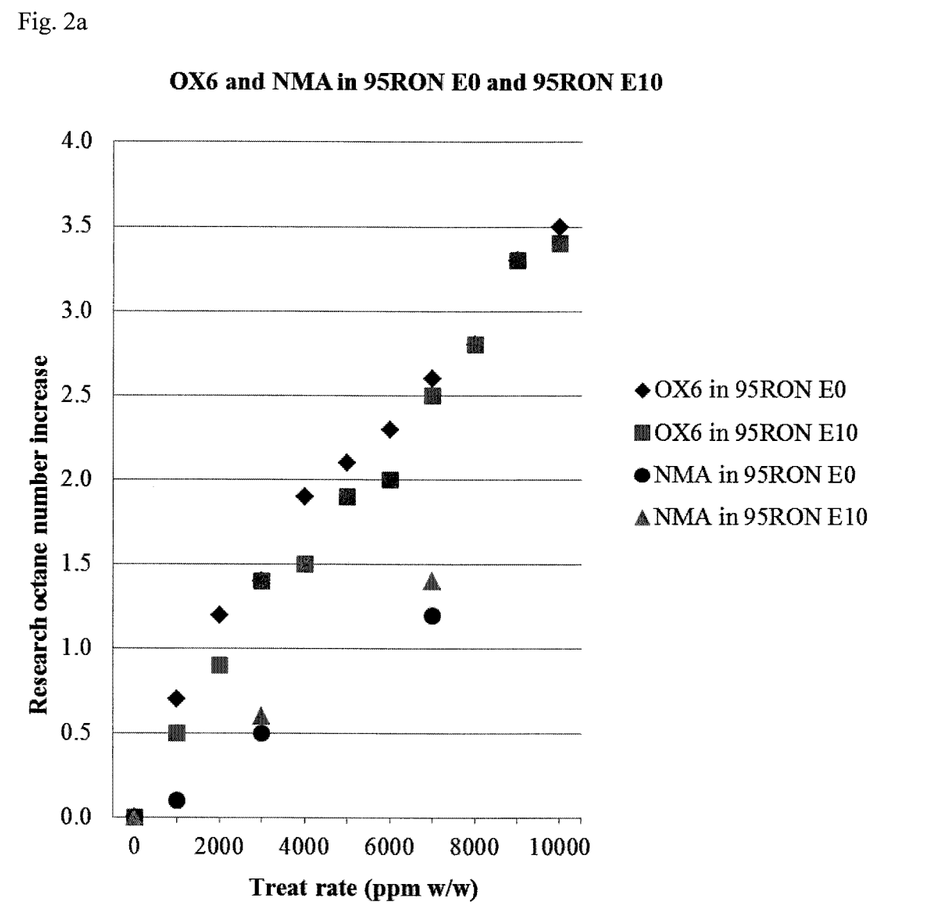
FIG. 2a shows a graph of the change in octane number of an E0 and an E10 fuel against treat rate.

A graph of the change in octane number of the E0 and E10 fuels against treat rate of N-methyl aniline and non-metallic octane-boosting additive (OX6) is shown in FIG. 2a. The treat rates are typical of what is used in a fuel. It can be seen from the graph that the performance of the non-metallic octane-boosting additives described herein is significantly better than that of N-methyl aniline across the treat rates.

Figure 2B:
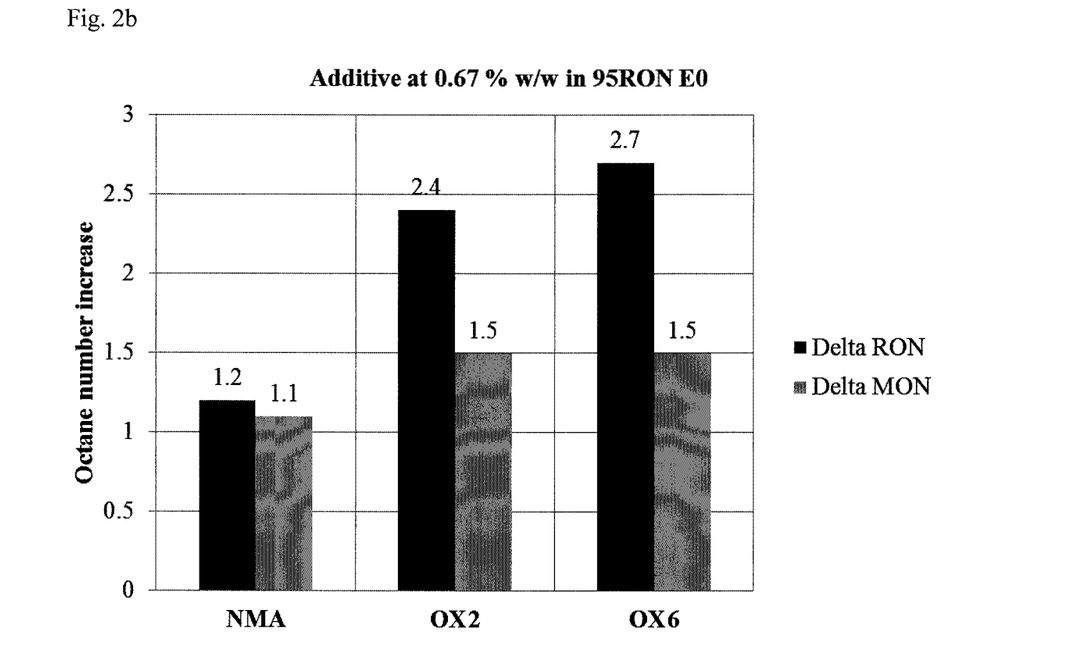
FIG. 2b shows a graph of the change in octane number of an E0 fuel at a treat rate of 0.67% w/w.
Figure 2C:
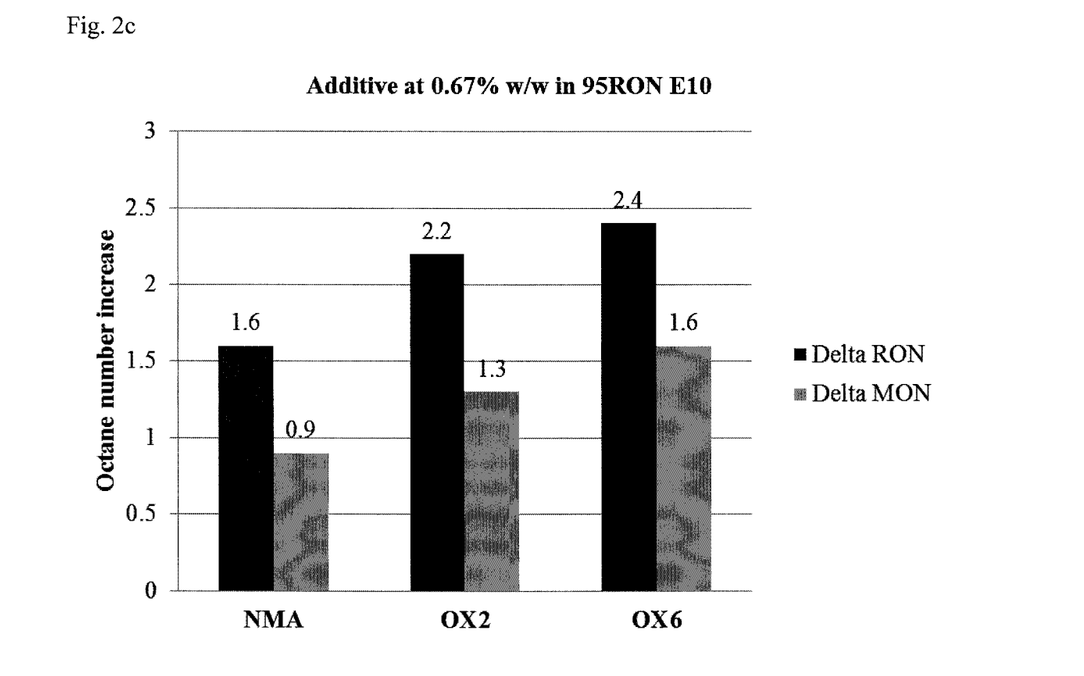
FIG. 2c shows a graph of the change in octane number of an E10 fuel at a treat rate of 0.67% w/w.

A comparison of the effect of two non-metallic octane-boosting additives (OX2 and OX6) and N-methyl aniline on the octane number of the E0 and E10 fuels at a treat rate of 0.67% w/w is shown in FIGS. 2b and 2c. It can be seen from the graph that the performance of non-metallic octane-boosting additives described herein is significantly superior to that of N-methyl aniline Specifically, an improvement of about 35% to about 50% is observed for the RON, and an improvement of about 45% to about 75% is observed for the MON.

Example 5

Effect of Non-Metallic Octane-Boosting Additives on the Distillation Profile of a Fuel The effect of a non-metallic octane-boosting additive from Example 1 (OX6) on the distillation profile of a fuel for a spark-ignition internal combustion engine was measured.

Three fuels were used: an E0 gasoline base fuel with a RON of 95, an E10 gasoline base fuel with a RON of 95 and an E0 gasoline base fuel with a RON of 90. The fuels were treated with 0.67% weight additive/weight base fuel, which increased the RON of each of the fuels by at least 2. As before, the RON of the base fuels, as well as the blends of base fuel and non-metallic octane-boosting additive, was determined according to ASTM D2699. The distillation profile of the fuel was measured according to ASTM D86.

Figure 3:
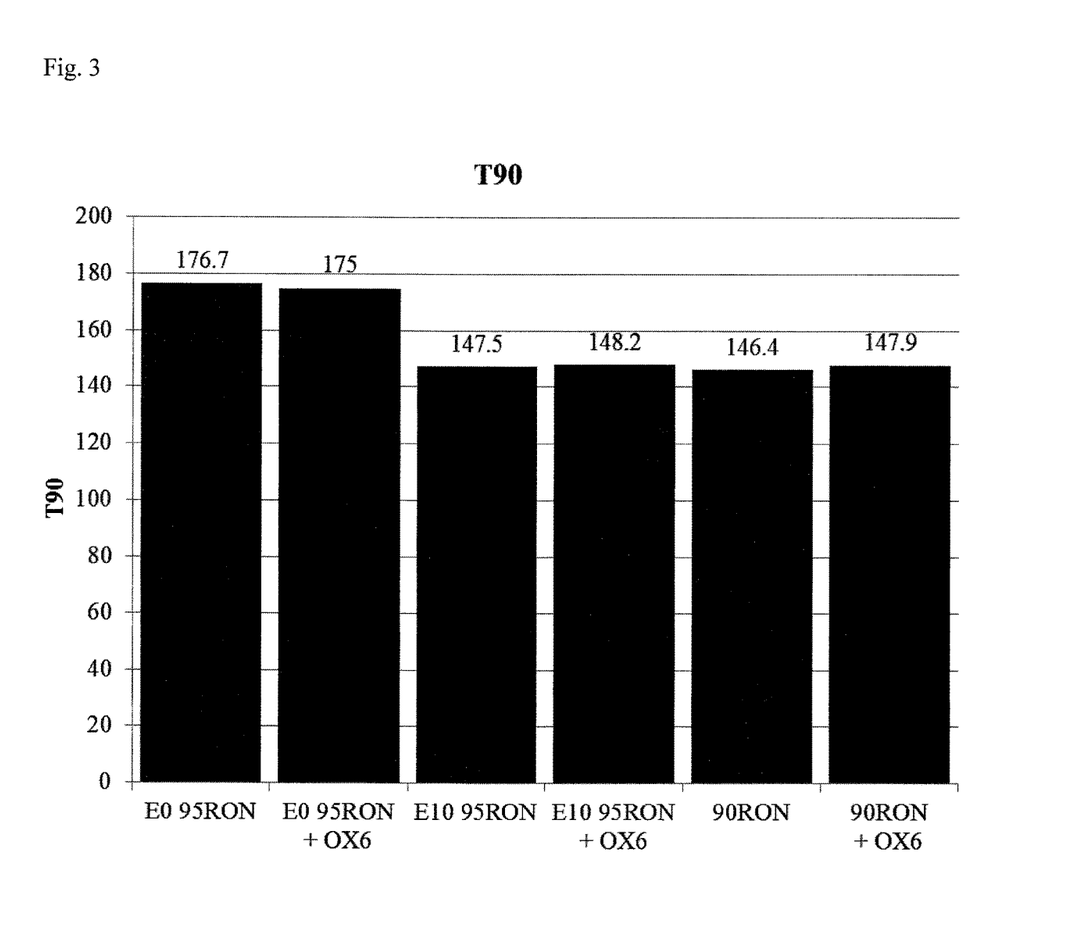
FIG. 3 shows a graphs comparing the $T_{90}$ of base fuels and the blends of base fuel and 0.67% w/w non-metallic octane-boosting additive.

A graph comparing the $T_{90}$ of the base fuels and the blends of base fuel and non-metallic octane-boosting additive is shown in FIG. 3. It can be seen that the non-metallic octane-boosting additive has minimal effect on the $T_{90}$ of the gasoline base fuels. Thus, it can be seen that non-metallic octane-boosting additives have successfully been used to increase the RON of a variety of fuels, whilst maintaining $T_{90}$.

Example 6

Effect of Non-Metallic Octane-Boosting Additives on the Vapour Pressure of a Fuel The effect of a non-metallic octane-boosting additive from Example 1 (OX6) on the vapour pressure of a fuel for a spark-ignition internal combustion engine was measured.

Two fuels were used: an E0 gasoline base fuel with a RON of 96.5 and an E10 gasoline base fuel with a RON of 99.3. The fuel was treated with 1.34% weight additive/weight base fuel.

As before, the RON of the base fuels, as well as the blends of base fuel and non-metallic octane-boosting additive, was determined according to ASTM D2699. The vapour pressure of the fuel was measured according to BS EN 13016.

The following table shows the RON and vapour pressure of the base fuels and the blends of fuel and non-metallic octane-boosting additive:

|  | E0 | E0 + OX6 | E10 | E10 + OX6 |
|---|---|---|---|---|
| RON | 96.5 | 99.9 | 99.3 | 102.2 |
| Vapour pressure (ASVP, kPa) | 61.4 | 61.3 | 68.4 | 68.4 |
| Vapour pressure (DVPE, kPa) | 55.5 | 55.4 | 62.2 | 62.2 |

It can be seen that the non-metallic octane-boosting additives have minimal effect on the vapour pressure of the gasoline base fuels, even when used at a treat rate of 1.34% w/w.

Example 7

Effect of Non-Metallic Octane-Boosting Additives on the Aromatics Content of a Fuel The effect of a non-metallic octane-boosting additive from Example 1 (OX6) on the aromatics content of a fuel for a spark-ignition internal combustion engine, determined according to the FIA IP156 method, was measured.

Two fuels were used: a gasoline base fuel having a RON of 90 and a gasoline base fuel having a RON of 95. The gasoline base fuel having a RON of 90 was treated with 0.67% weight additive/weight base fuel to increase the RON of the fuel to around 95. A negligible increase in the aromatics content of the fuel determined according to the FIA IP156 method was observed (<0.4%).

The dimensions and values disclosed herein are not to be understood as being strictly limited to the exact numerical values recited. Instead, unless otherwise specified, each such dimension is intended to mean both the recited value and a functionally equivalent range surrounding that value. For example, a dimension disclosed as "40 mm" is intended to mean "about 40 mm."

Every document cited herein, including any cross referenced or related patent or application, is hereby incorporated herein by reference in its entirety unless expressly excluded or otherwise limited. The citation of any document is not an admission that it is prior art with respect to any invention disclosed or claimed herein or that it alone, or in any combination with any other reference or references, teaches, suggests or discloses any such invention. Further, to the extent that any meaning or definition of a term in this document conflicts with any meaning or definition of the same term in a document incorporated by reference, the meaning or definition assigned to that term in this document shall govern.

While particular embodiments of the present invention have been illustrated and described, it would be obvious to those skilled in the art that various other changes and modifications can be made without departing from the spirit and scope of the invention. It is therefore intended to cover in the appended claims all such changes and modifications that are within the scope and spirit of this invention.

The invention claimed is:

1. A fuel composition for a spark-ignition internal combustion engine, the fuel composition comprising a non-metallic octane-boosting additive and a base fuel, wherein the non-metallic octane-boosting additive has the formula:

where:
$R_1$ is hydrogen;
$R_2$, $R_3$, $R_4$, $R_5$, $R_{11}$ and $R_{12}$ are each independently selected from hydrogen, alkyl, alkoxy, alkoxy-alkyl, secondary amine and tertiary amine groups;
$R_6$, $R_7$, $R_8$ and $R_9$ are each independently selected from hydrogen, alkyl, alkoxy, alkoxy-alkyl, secondary amine and tertiary amine groups;
X is selected from —O— or —NR$_{10}$—, where $R_{10}$ is selected from hydrogen and alkyl groups; and
n is 0 or 1,
wherein at least one of $R_2$, $R_3$, $R_4$, $R_5$, $R_6$, $R_7$, $R_8$, $R_9$, $R_{11}$ and $R_{12}$ is selected from a group other than hydrogen; and
wherein the non-metallic octane-boosting additive, when used at a treat rate of 0.67% weight additive/weight base fuel, increases the research octane number of a fuel by at least 1.8 without increasing:
the $T_{90}$ by more than 2.5%; or
the vapour pressure by more than 2.0%.

2. A fuel composition according to claim 1, wherein the non-metallic octane-boosting additive, when used at a treat rate of 0.67% weight additive/weight base fuel, increases the research octane number of a fuel by at least 1.8 without increasing:
the $T_{90}$ by more than 2.5%; and
the vapour pressure by more than 2.0%.

3. A fuel composition according to claim 1, wherein the non-metallic octane-boosting additive, when used at a treat rate of 0.67% by weight, increases the research octane number of a fuel by at least 2.5.

4. A fuel composition according to claim 1, wherein the non-metallic octane-boosting additive, when used at a treat rate of 0.67% by weight, does not increase the $T_{90}$ of a fuel by more than 2.0%.

5. A fuel composition according to claim 1, wherein the non-metallic octane-boosting additive, when used at a treat rate of 0.67% by weight, does not increase the vapour pressure of a fuel by more than 1.0%.

6. A fuel composition according to claim 1, wherein the fuel composition has a research octane number of at least 80.

7. A fuel composition according to claim 1, wherein the non-metallic octane-boosting additive has a blending research octane number of greater than 290.

8. A fuel composition according to claim 1, wherein $R_2$, $R_3$, $R_4$, $R_5$, $R_{11}$ and $R_{12}$ are each independently selected from hydrogen and alkyl groups.

9. A fuel composition according to claim 1, wherein $R_6$, $R_7$, $R_8$ and $R_9$ are each independently selected from hydrogen, alkyl and alkoxy groups.

10. A fuel composition according to claim 1, wherein at least one of $R_6$, $R_7$, $R_8$, and $R_9$ is selected from a group other than hydrogen.

11. A fuel composition according to claim 1, wherein no more than five of $R_2$, $R_3$, $R_4$, $R_5$, $R_6$, $R_7$, $R_8$, $R_9$, $R_{11}$ and $R_{12}$ are selected from a group other than hydrogen.

12. A fuel composition according to claim 1, wherein at least one of $R_2$ and $R_3$ is hydrogen.

13. A fuel composition according to claim 1, wherein at least one of $R_4$, $R_5$, $R_7$ and $R_8$ is selected from methyl, ethyl, propyl and butyl groups and the remainder of $R_2$, $R_3$, $R_4$, $R_5$, $R_6$, $R_7$, $R_8$, $R_9$, $R_{11}$ and $R_{12}$ are hydrogen.

14. A fuel composition according to claim 13, wherein at least one of $R_4$, $R_5$, $R_7$ and $R_8$ is a methyl group and the remainder of $R_2$, $R_3$, $R_4$, $R_5$, $R_6$, $R_7$, $R_8$, $R_9$, $R_{11}$ and $R_{12}$ are hydrogen.

15. A fuel composition according to claim 1, wherein X is —O— or —NR$_{10}$—, where $R_{10}$ is selected from hydrogen, methyl, ethyl, propyl and butyl groups.

16. A fuel composition according to claim 1, wherein n is 0.

17. A fuel composition according to claim 1, wherein the additive is selected from:

18. A fuel composition according to claim 1, wherein the additive is present in the fuel composition an amount of up to 20%.

19. A fuel composition according to claim 1, wherein ethanol is present in the fuel composition in an amount of up to 85% by volume.

20. A method for increasing the octane number, whilst maintaining the $T_{90}$ or the vapour pressure, of a fuel for a spark-ignition internal combustion engine, wherein the method comprises blending a non-metallic octane-boosting additive with the fuel.

21. A fuel composition according to claim 1, wherein the additive is selected from:

22. A fuel composition according to claim 1, wherein the additive is a mixture of:

* * * * *